Sept. 19, 1933.  H. T. HEALE ET AL  1,927,367
SWIVEL COUPLING
Filed March 16, 1933

INVENTORS.

Patented Sept. 19, 1933

1,927,367

UNITED STATES PATENT OFFICE 1,927,367

SWIVEL COUPLING

Henry Treby Heale and David Finnes, London, England

Application March 16, 1933, Serial No. 661,144, and in Great Britain March 8, 1932

1 Claim. (Cl. 59—95)

This invention is for improvement in or relating to swivel-couplings of the type comprising two links or the equivalent, each of which is rotatably mounted on a pin that connects the links together.

Swivel-couplings of this type are employed, for example, when repairing submarine telegraph cables, to unite that part of the stopper ropes which is connected to a winding engine on a vessel from which the repairs are carried out, to those parts of said ropes that are attached to the damaged cable. The couplings at present in general use have plain bearings, and frequently the pin and links become jammed together, so that free rotation of the links is impaired, and consequently when the vessel swings the cable is liable to coil or foul. It is an object of the invention to improve such swivel-couplings so as to lessen the possibility of the pin and links becoming jammed or locked together.

Although the invention is more particularly intended for use with stopper ropes for repairing submarine cables, it is to be understood that it is not limited thereto, but can be employed wherever a coupling of the aforesaid type is required.

According to the present invention, an antifriction bearing is provided between the pin and each of the links that is rotatably mounted thereon.

Generally, the anti-friction bearing will be disposed between one end of the link and a shoulder or the equivalent on the pin aforesaid, so as to take the thrust when a pull is exerted on the links.

In a convenient construction the said pin has a ball-race at each end, and a co-operating race is provided on the adjoining link. If desired, at least one of the ball-races on the pin may be detachably mounted thereon, to permit access to the bearings, or the coupling to be dismantled.

One embodiment of the invention, given by way of example, will now be described with reference to the accompanying drawing in which:—

Like reference numerals indicate like parts throughout.

Figure 1:
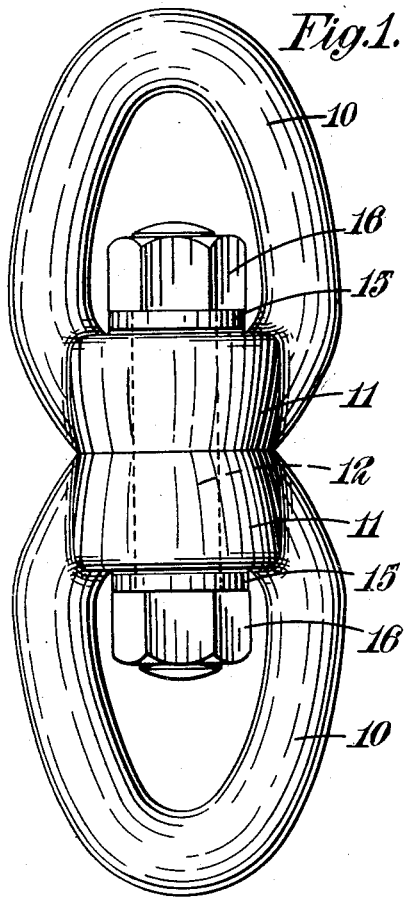
Figure 1 is a front elevation of the coupling.
Figure 3:
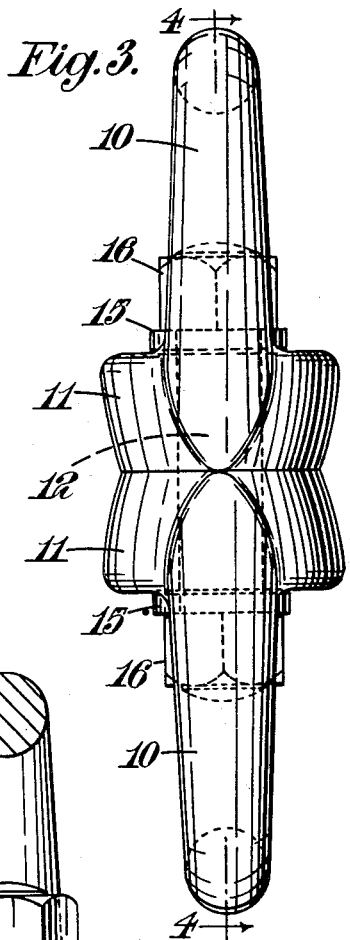
Figure 3 is a side elevation.
Figure 2:
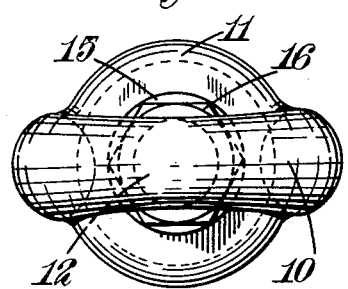
Figure 2 is a plan thereof.
Figure 4:
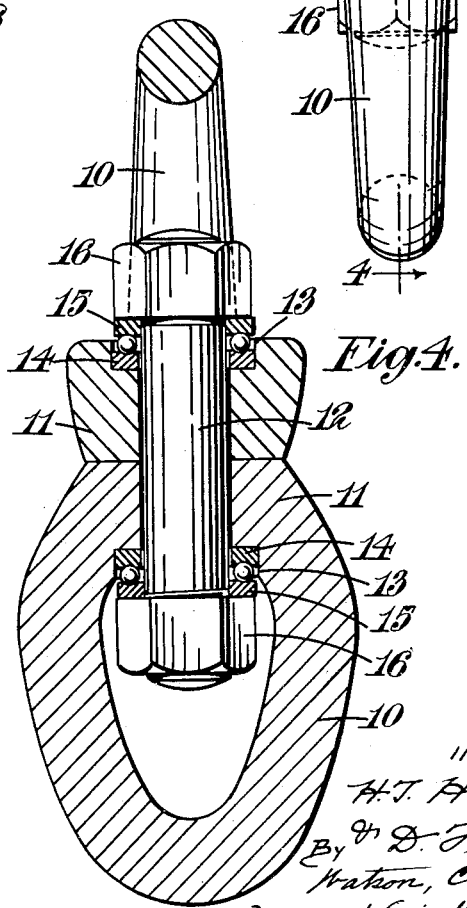
Figure 4 is a section on the line 4—4 of Figure 3 with the upper link turned through 90°.

The coupling comprises two similar mild steel links 10 each having at one end a circular portion 11 into which the sides of the link merge. These circular portions are bored centrally and mounted side by side on a non-corrosive steel pin 12 so that they can rotate freely thereon. The pin extends through the circular portions 11 into each link, and at each end of the pin a ball thrust bearing is provided.

In the inner face of each circular portion 11 a recess 13 is formed in which a case-hardened ball-race 14 is mounted. The balls are arranged between that race and a case-hardened ball-race 15 mounted loosely on the pin 12. The latter race is held in position by a nut 16 on the pin. Thus by unscrewing the nut, access can be had to the ball bearing, or the coupling can be dismantled.

It is to be understood that the invention is not restricted to the specific construction described. For instance, it is not essential that the coupling shall comprise two links. In some cases it may be necessary to replace one of the links by a hook or other device, and the term "links or the equivalent" herein is intended to include any such device.

We claim:

A swivel coupling comprising two integral links each having at one end a substantially circular portion, the circular portion of said links having substantially flat opposed faces, a pin on which said circular portions are rotatably mounted with the flat faces thereof disposed in abutting relation, a ball thrust bearing at each end of the pin comprising a ball race in the inner face of each of said circular portions and a cooperating ball race mounted losely on the pin, and a headed portion on each end of the pin to hold the latter races in position, one of said headed portions being removable from the pin, said links extending generally axially of and beyond the ends of the pin.

HENRY TREBY HEALE.
DAVID FINNES.